(12) United States Patent
Luellich et al.

(10) Patent No.: US 11,855,383 B2
(45) Date of Patent: Dec. 26, 2023

(54) COOLING DEVICE FOR A CONNECTOR ELEMENT AND CONNECTOR ELEMENT FOR HIGH-VOLTAGE APPLICATIONS

(71) Applicant: TE Connectivity Germany GmbH, Bensheim (DE)

(72) Inventors: Eike Tim Luellich, Bensheim (DE); Martin Listing, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 270 days.

(21) Appl. No.: 17/323,453

(22) Filed: May 18, 2021

(65) Prior Publication Data

US 2021/0367374 A1    Nov. 25, 2021

(30) Foreign Application Priority Data

May 22, 2020 (DE) .................... 10 2020 206 416.4

(51) Int. Cl.
*H01R 13/00* (2006.01)
*H01R 13/533* (2006.01)
*H01R 43/00* (2006.01)

(52) U.S. Cl.
CPC ........... *H01R 13/533* (2013.01); *H01R 43/00* (2013.01)

(58) Field of Classification Search
CPC .............................. H01R 13/533; H01R 43/00
See application file for complete search history.

(56) References Cited

U.S. PATENT DOCUMENTS

| | | | |
|---|---|---|---|
| 6,190,846 B1 * | 2/2001 | Majumdar | B41M 5/44 430/529 |
| 6,270,884 B1 * | 8/2001 | Guhde | C09D 4/00 106/14.44 |
| 6,688,799 B2 * | 2/2004 | Broker | F16C 11/0628 403/135 |
| 7,004,782 B2 * | 2/2006 | Kroenung | H01R 13/639 439/456 |
| 2014/0273571 A1 | 9/2014 | Iyer et al. | |
| 2015/0217654 A1 | 8/2015 | Woo et al. | |
| 2019/0036254 A1 | 1/2019 | Moseke | |
| 2019/0109409 A1 | 4/2019 | Fuehrer et al. | |
| 2019/0176653 A1 | 6/2019 | Fuehrer et al. | |

FOREIGN PATENT DOCUMENTS

| | | |
|---|---|---|
| CN | 107658652 A | 2/2018 |
| CN | 108847316 A | 11/2018 |
| CN | 107039808 B | 2/2019 |
| CN | 109727713 A | 5/2019 |
| CN | 111129856 A | 5/2020 |
| EP | 3401955 A1 | 11/2018 |
| WO | 2021147871 A1 | 7/2021 |

OTHER PUBLICATIONS

Extended European Search Report, App. No. 21174617.7-1205, dated Oct. 15, 2021, 12 pages.

* cited by examiner

*Primary Examiner* — Phuong Chi Thi Nguyen

(74) *Attorney, Agent, or Firm* — Barley Snyder

(57) ABSTRACT

A cooling device for a connector element includes a cooling channel through which a cooling fluid can flow during operation and a bearing element holding the cooling channel. The cooling channel is a component separate from the bearing element and has a shape of a hollow duct engaging around the bearing element at least in a part of a circumference of the bearing element.

16 Claims, 4 Drawing Sheets

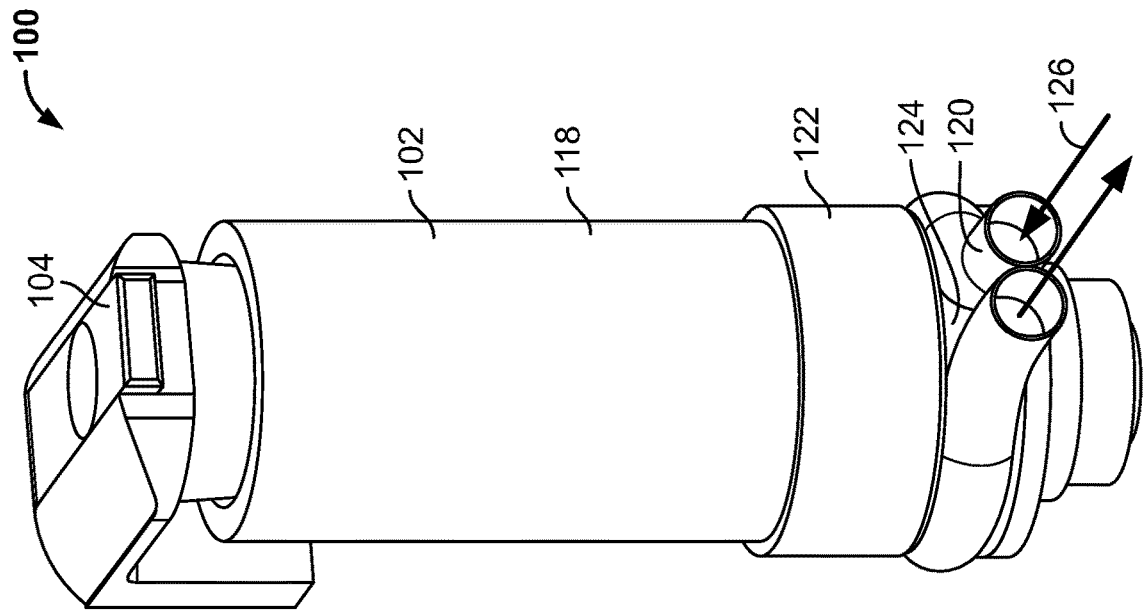
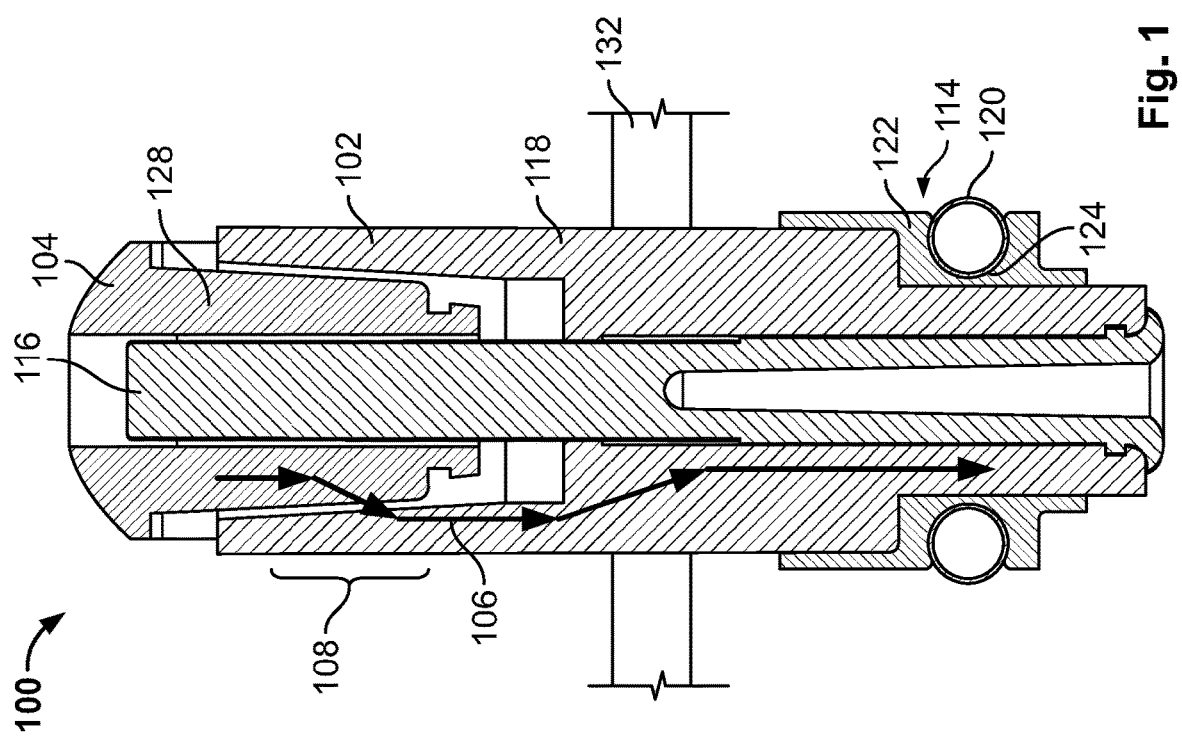

COOLING DEVICE FOR A CONNECTOR ELEMENT AND CONNECTOR ELEMENT FOR HIGH-VOLTAGE APPLICATIONS

CROSS-REFERENCE TO RELATED APPLICATIONS

This application claims the benefit of the filing date under 35 U.S.C. § 119(a)-(d) of German Patent Application No. 102020206416.4, filed on May 22, 2020.

FIELD OF THE INVENTION

The present invention relates to a connector element and, more particularly, to a cooling device for a connector element.

BACKGROUND

In electromobility, high-voltage (HV) connectors with large cable cross-sections are required to drive and charge the HV battery. In order to shorten the charging times or to obtain the required power from a battery, high electrical current densities are in part required in the HV system. As a result, the temperature in a connector can increase impermissibly under unfavorable conditions. Reaching the maximum allowable temperature limits the energy that can be transmitted. Passive cooling and the provision of sufficiently large cable cross-sections can remedy this, but usually leads to undesirably large dimensions of the connector and high material costs.

Active cooling with the aid of a cooling fluid, for example, a cooling liquid, is therefore advantageous. Known connector elements with integrated cooling channels, however, have the drawback that, firstly, they are not suitable for retrofitting existing connector systems and, secondly, they are complex components that are difficult to manufacture.

There is therefore a demand for a cooling device for a connector element as well as an associated connector element which overcome the drawbacks of the known solutions so that the connector elements produced are safe and reliable, but can nevertheless be manufactured inexpensively and take up little installation space.

SUMMARY

A cooling device for a connector element includes a cooling channel through which a cooling fluid can flow during operation and a bearing element holding the cooling channel. The cooling channel is a component separate from the bearing element and has a shape of a hollow duct engaging around the bearing element at least in a part of a circumference of the bearing element.

BRIEF DESCRIPTION OF THE DRAWINGS

The invention will now be described by way of example with reference to the accompanying Figures, of which:

FIG. 1 is a sectional side view of a high-voltage connector system according to a first embodiment;

FIG. 2 is a perspective view of the high-voltage connector system of FIG. 1;

DETAILED DESCRIPTION OF THE EMBODIMENT(S)

Figure 3:
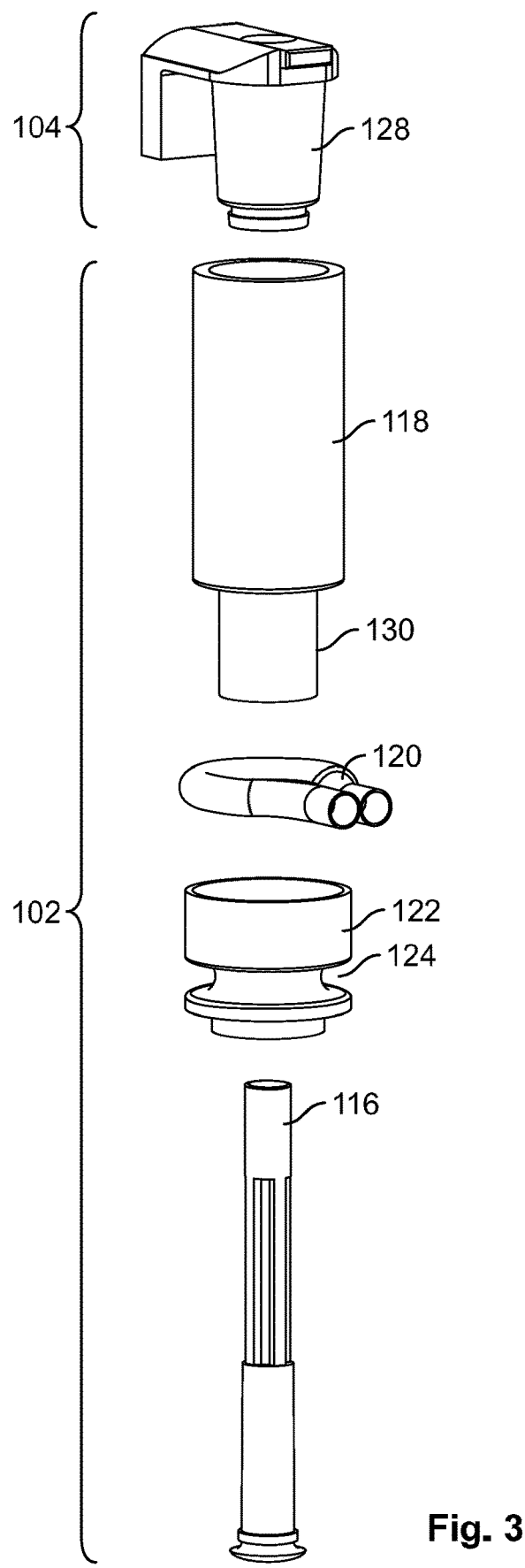
FIG. 3 is an exploded perspective view of the high-voltage connector system of FIG. 1.

The present invention shall be explained in more detail below with reference to the embodiments illustrated in the figures. Same elements are there designated with same reference numerals and same component designations. Furthermore, some features or combinations of features from the different embodiments shown and described can also be independent inventive solutions by themselves or solutions according to the invention. It is noted that the size ratios and in particular the layer thickness ratios in all of the figures are not necessarily reproduced true to scale. Furthermore, parts that are not necessary or impedimental for understanding are not shown, in particular electrically insulating housing elements and protective covers.

The figures explain an example of an active cooling solution that is used in a high-voltage (HV) round connector (e.g. with a diameter of 12 mm). Other connector geometries can of course also be configured with a cooling device according to the principles of the present invention. Furthermore, the cooling device can also be provided on both connector elements or only on a mating connector element, although this is not shown in the figures. In other words, the cooling device does not necessarily have to be (only) associated with the socket element.

FIG. 1 shows a connector system 100 according to a first advantageous embodiment of the present invention in the form of a sectional view. FIG. 2 shows the corresponding perspective view of connector system 100 according to the first embodiment.

Connector system 100 comprises a first connector element 102 which is configured as a socket element. As shown in FIG. 1, first connector element 102 is mounted in a housing element 132. Furthermore, connector system 100 comprises a second connector element 104 which can also be referred to as a mating connector element. Second connector element 104 comprises an electrically conductive pin-shaped contact unit 128 which dips into socket-shaped base body 118 of the first connector element 102. In the assembled state, which is shown in FIGS. 1 and 2, electrical current can flow via a contact region 108, as is symbolized by arrows 106. Base body 118 is typically connected to a busbar which is arranged in the lower region of the base body 118 in FIG. 1 for drawing the current.

In the assembled state, second connector element 104 is pressed against base body 118 in contact region 108, as shown in FIG. 1. As a result, a current flow (current arrows 106) can take place between electrically conductive second connector element 104 into base body 118 of first connector element 102.

In order to prevent the live parts of first connector element 102 from being touched in the unmated state, a contact protection element 116 is arranged on first connector element 102 as shown in FIG. 1. Contact protection element 116 is made of electrically non-conductive material. In interaction with a plastic housing, contact protection element 116 prevents objects that have dimensions larger than a defined test finger from being able to contact the live parts.

As shown in FIGS. 1 and 2, connector system 100 comprises a cooling device 114 for dissipating heat that is generated when an electrical current flows. Cooling device 114 comprises in particular a cooling channel which is formed by a hollow duct 120. Hollow duct 120 is held in a bearing element 122. Bearing element 122 according to the embodiment shown in FIGS. 1 to 3 is a plastic sleeve which comprises a groove 124 for holding hollow duct 120. In an embodiment, the hollow duct 120 engages around the bearing element 122 at least in part of a circumference of the bearing element 122. Such a hollow duct 120 is designed, for example, as a hose or pipe and is placed as close as possible to the hotspot around the connector element 102.

As is evident from FIG. 2, a coolant 126 can flow through hollow duct 120. This can be, for example, a cooling fluid and in particular cooling liquid. As a result of the heat-conducting contact of hollow duct 120 with base body 118 at a relatively small distance from contact region 108, coolant 126 passed through hollow duct 120 can efficiently transport away the heat that is generated. Cooling fluid 126 can be connected, for example, to the cooling liquid circuit of a motor vehicle. The cooling solution can also simply work following the principle of a heat pipe and provide that the closed hollow duct 120 filled with coolant terminates at a cooling element so that the coolant evaporates on the connector element 102 and again condenses on the cooling element acting as a heat sink.

The hollow duct 120 can wrap around only part of the circumference of the cooling device connector element 102 or it can be run with several turns around the bearing element 122 and thereby around the circumference of the connector element 102. If the hollow duct 120 engages around the bearing element 122 with a plurality of turns, heat dissipation is improved because a larger area of the connector element 102 can be in thermally conductive connection with the cooling fluid. Furthermore, several separate hollow ducts 120 can also be run in parallel. Existing connector elements 102 can be retrofitted particularly easily if the step of attaching the cooling channel comprises winding at least one turn of the hollow duct 120 around the bearing element 122.

In an embodiment, the bearing element 122 has a tubular shape and the hollow duct 120 forming the cooling channel is held in a radially circumferential groove. This ensures that the hollow duct 120 is held securely, even under harsh environmental conditions such as vibrations and strong temperature fluctuations.

In the embodiment shown in FIGS. 1 to 3, bearing element 122 made of insulating material makes it possible to ensure electrical insulation between hollow duct 120 and base body 118 of first connector element 102. For example, the bearing element 122 can be formed by a plastic sleeve which is slid onto the connector element 102. It is therefore not necessary for the material of hollow duct 120 to be electrically insulating. For example, hollow duct 120 can be made from metal, such as copper, and can optionally have further coatings. This has the advantage of particularly good thermal conductivity. In addition, a copper tube is comparatively stable and robust, even under adverse environmental conditions. In particular when the bearing element 122 is at least in part electrically conductive, it is advantageous to produce the hollow duct 120 from electrically insulating but nevertheless thermally well conductive material.

Depending on whether electrically insulating properties are required, the hollow duct 120 can be made, for example, from copper or silicone at least in part. All other materials suitable for producing a separate cooling line, such as polytetrafluoroethylene (PTFE), polyethylene (PE) or polypropylene (PP), can of course also be used. Composite hoses that are e.g. reinforced by linings made of metal, fiberglass or textile braids, can of course also be considered.

FIG. 3 shows an exploded view of connector system 100 according to the first example. As is evident from this view, bearing element 122 can be slid in the axial direction onto base body 118 for the assembly of the assembly. Hollow duct 120 can be inserted into groove 124 before being mounted onto the base body 118 or afterwards. Cooling device 114 is there arranged in a region 130 with a reduced cross section. This ensures that the installation space required in the radial direction can be kept as small as possible.

Furthermore, the present invention relates to a method for installing a high-voltage connector element, the method comprising the following steps: providing a base body 118 with a bearing element 122; and attaching a cooling channel which is held by the bearing element 122, where the cooling channel is a component separate from the bearing element 122 and has the shape of a hollow duct 120 which engages around the bearing element 122 at least in part of a circumference of the bearing element 122.

In the embodiment shown in FIGS. 1 to 3, hollow duct 120 is run around bearing element 122 with only a single turn. This variant has the advantage that hollow duct 120 can be installed in a simple manner and requires little additional space in the axial direction. If, on the other hand, a larger heat-conducting contact surface is to be provided between the hollow duct 120 and the first connector element 102, then it can also be provided that the hollow duct 120 surrounds the bearing element 122 with several turns. An example of such a solution is illustrated in FIGS. 4 and 5.

Figure 4:
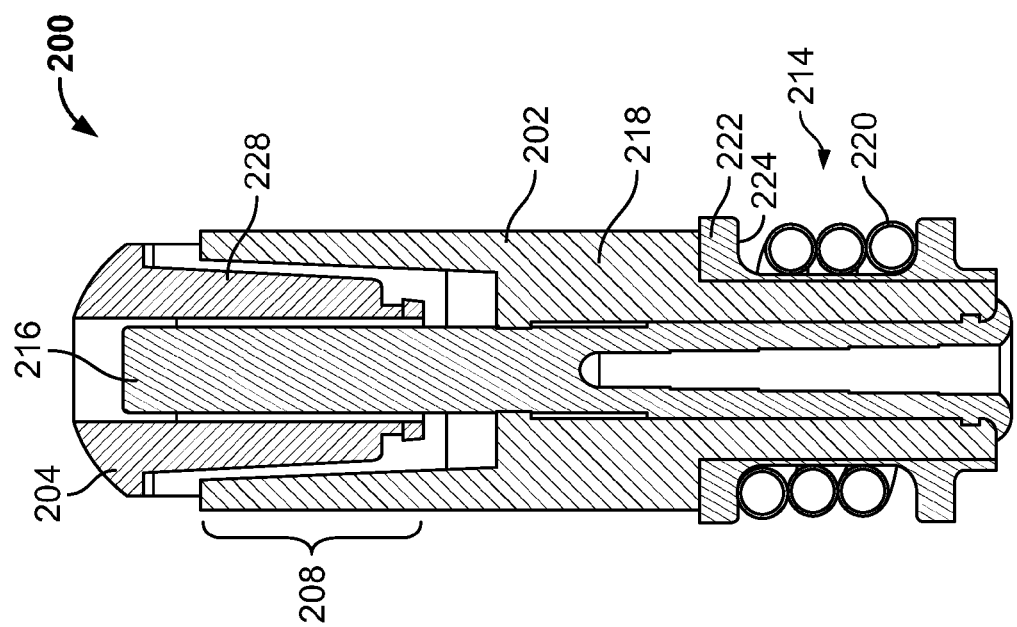
FIG. 4 is a sectional side view of a high-voltage connector system according to a second embodiment.

FIG. 4 shows a connector system 200 according to a second advantageous embodiment of the present invention in the form of a sectional view. FIG. 5 shows the corresponding perspective view of connector system 200 according to the second embodiment. Connector system 200 comprises a first connector element 202 which is configured as a socket element. First connector element 202 is mounted in a busbar. Furthermore, connector system 200 comprises a second connector element 204 which can also be referred to as a mating connector element. In the assembled state, which is presently shown, electrical current can flow via a contact region 208.

Figure 5:
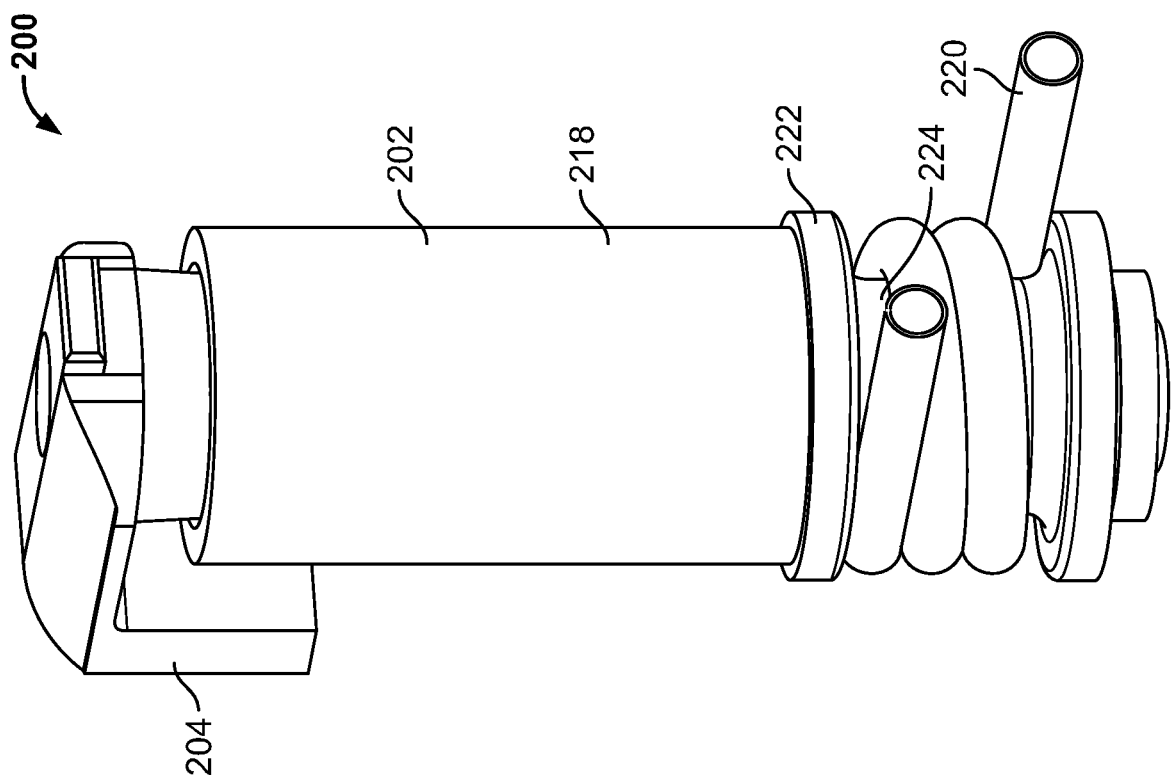
FIG. 5 is a perspective view of the high-voltage connector system of FIG. 4.

First connector element 202 comprises an electrically conductive base body 218, as shown in FIGS. 4 and 5. In the assembled state, second connector element 204 is pressed against the inner wall of base body 218 in contact region 208. As a result, a current flow can take place between electrically conductive second connector element 204 into base body 218 of first connector element 202.

In order to prevent the live parts of first connector element 202 from being touched in the unmated state, a contact protection element 216 is arranged on first connector element 202, as shown in FIG. 4. Contact protection element 216 is made of electrically non-conductive material. In interaction with a plastic housing, contact protection element 216 prevents objects that have dimensions larger than a defined test finger from being able to contact the live parts.

According to the present invention, connector system 200 comprises a cooling device 214 shown in FIG. 4 for dissipating heat that is generated when an electrical current flows. Cooling device 214 comprises a cooling channel which is formed by a hollow duct 220. Hollow duct 220 is held in a bearing element 222. Bearing element 222 according to the embodiment shown in FIGS. 4 and 5 is a plastic sleeve which comprises a groove 224 for holding hollow duct 220. Groove 224 extends in the axial direction far enough so that hollow duct 220 can be wound several times around bearing element 222. As a result, the heat-conducting transition between base body 218 and the cooling duct 220 is enlarged in comparison to the first embodiment and the efficiency of the heat dissipation is increased as a result.

As described with reference to FIGS. 1 to 3, a coolant flows through hollow duct 220 during operation. This can be, for example, a cooling fluid and in particular a cooling liquid. As a result of the heat-conducting contact of hollow duct 220 with base body 218 at a relatively small distance from contact region 208, the coolant passed through hollow duct 220 can efficiently transport away the heat that is generated. The cooling fluid can be connected, for example, to the cooling liquid circuit of a motor vehicle.

Also in the second embodiment shown in FIGS. 4 and 5, bearing element 222 made of insulating material makes it possible to ensure electrical insulation between hollow duct 220 and base body 218 of first connector element 202. It is therefore not necessary for the material of hollow duct 220 to be electrically insulating. For example, hollow duct 220 can be made from metal, such as copper. This has the advantage of particularly good thermal conductivity. In addition, a copper tube is comparatively stable and robust, even under adverse environmental conditions.

If, on the other hand, electrically insulating (but nevertheless thermally well conductive) material is used for the hollow duct 220, then the bearing element 222 can also be configured as an integral part of the electrically conductive base body 218 of the first connector element 202. An example of such a third embodiment is shown in FIGS. 6 and 7.

Figure 6:
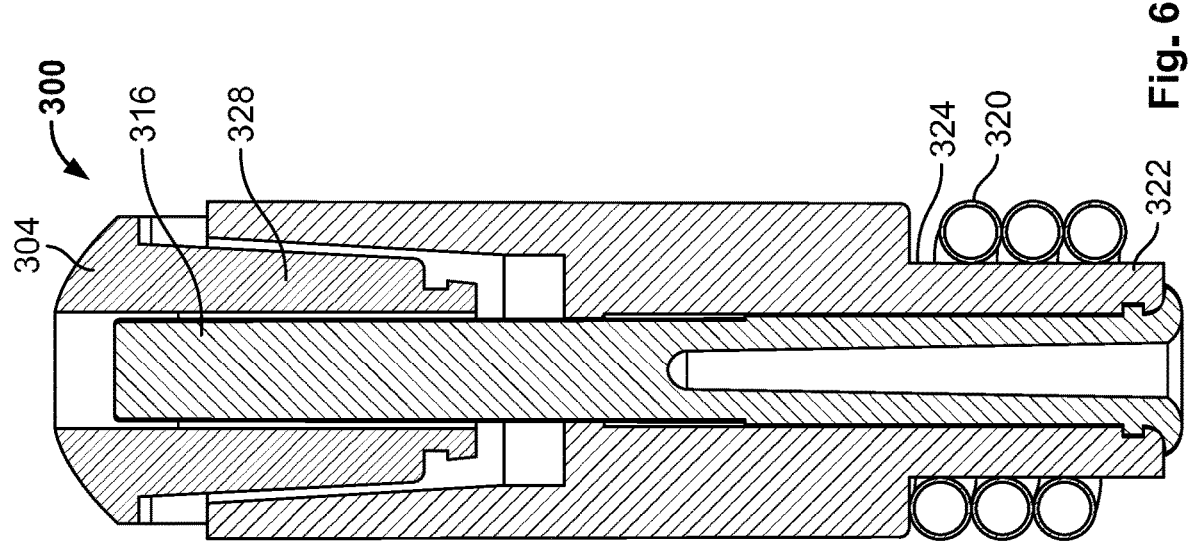
FIG. 6 is a sectional side view of a high-voltage connector system according to a third embodiment.

FIG. 6 shows a connector system 300 according to a third advantageous embodiment of the present invention in the form of a sectional view. FIG. 7 shows the corresponding perspective view of connector system 300 according to the third embodiment. Connector system 300 comprises a first connector element 302 which is configured as a socket element. First connector element 302 is mounted in a busbar. Furthermore, connector system 300 comprises a second connector element 304 which can also be referred to as a mating connector element. In the assembled state, which is presently shown, electrical current can flow via a contact region 308.

Figure 7:
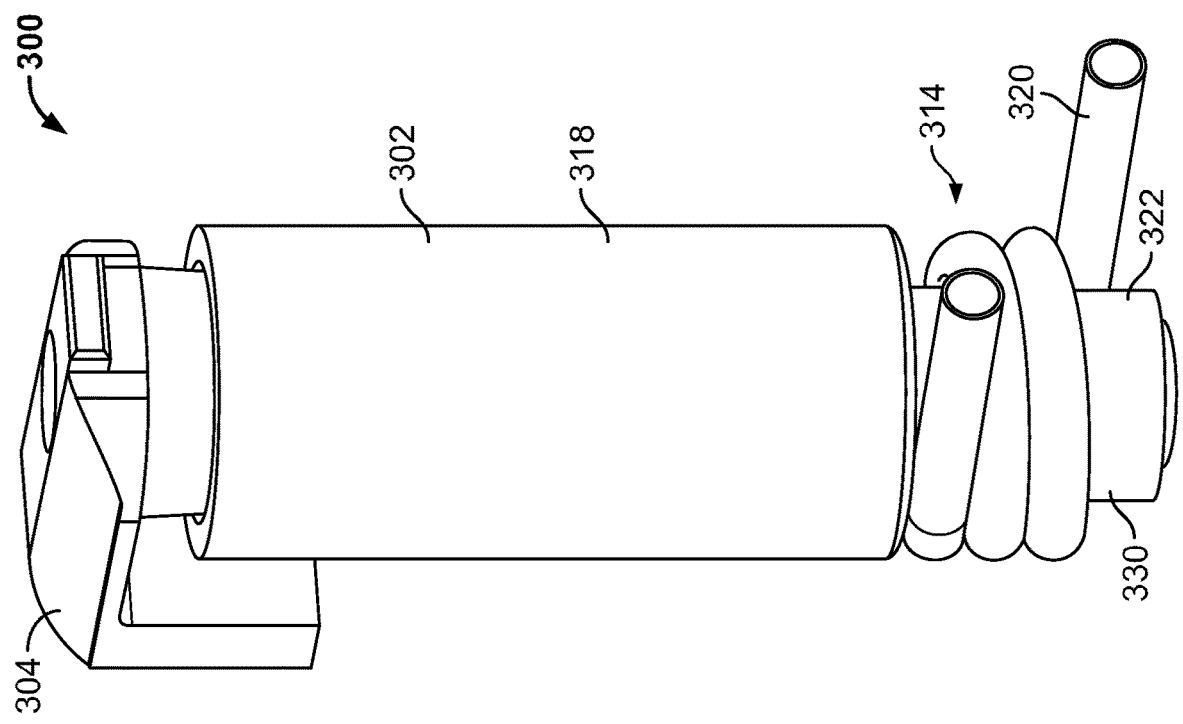
FIG. 7 is a perspective view of the high-voltage connector system of FIG. 6.

First connector element 302 comprises an electrically conductive base body 318, as shown in FIG. 7. In the assembled state, second connector element 304 is pressed against the inner wall of base body 318 in contact region 308. As a result, a current flow can take place between electrically conductive second connector element 304 into base body 318 of first connector element 302.

In order to prevent the live parts of first connector element 302 from being touched in the unmated state, a contact protection element 316 is arranged on first connector element 302, as shown in FIG. 6. Contact protection element 316 is made of electrically non-conductive material. In interaction with a plastic housing, contact protection element 316 prevents objects that have dimensions larger than a defined test finger from being able to contact the live parts.

According to the present invention, connector system 300 comprises a cooling device 314 shown in FIGS. 6 and 7 for dissipating heat that is generated when an electrical current flows. Cooling device 314 comprises in particular a cooling channel which is formed by a hollow duct 320. Hollow duct 320 is held in a bearing element 322. Bearing element 322 according to the embodiment shown in FIGS. 6 and 7 is a region 330 with a reduced cross section which forms a groove 324 for holding hollow duct 320. Region 330 with a reduced cross section extends in the axial direction far enough so that hollow duct 320 can be wound several times around bearing element 322. As a result, the heat-conducting transition between base body 318 and the cooling duct is enlarged in comparison to the first embodiment and the efficiency of the heat dissipation is increased as a result. For the reason that the mounting of hollow duct 320 is formed integrally with base body 318, a significantly closer heat-conducting contact with the cooling fluid can be established and the thermal management can thereby be further improved. In addition, mounting a separate bearing element, for example, configured as a sleeve is omitted.

Like described with reference to FIGS. 1 to 5, a coolant flows through hollow duct 320 during operation. This can be, for example, a cooling fluid and in particular a cooling liquid. As a result of the heat-conducting contact of hollow duct 320 with base body 318 at a relatively small distance from contact region 308, the coolant passed through hollow duct 320 can efficiently transport away the heat that is generated. The cooling fluid can be connected, for example, to the cooling liquid circuit of a motor vehicle.

In the third embodiment shown in FIGS. 6 and 7, the material of hollow duct 320 must be at least in part electrically insulating in order to ensure electrical insulation between the cooling fluid and base body 318 of first connector element 302. For example, hollow duct 320 can be made from plastic material such as silicone. Polytetrafluoroethylene (PTFE), polyethylene (PE) or polypropylene (PP) can be used as further possible materials. Composite hoses that are e.g. reinforced by linings made of metal, fiberglass or textile braids, can of course also be considered.

FIGS. 6 and 7 show that hollow duct 320 is run several times around base body 318 in order to form a plurality of turns. Only a single turn (similar to that shown in FIGS. 1 to 3) can of course also be provided.

The present invention is based on the idea of achieving active cooling with minimal additional space requirement by providing a separate hollow duct 120 through which a cooling fluid can flow during operation and which is attached to the connector element 102. The hollow duct 120, which is also referred to as a cooling line and forms a cooling channel, is advantageously placed in the vicinity of the contact point (also referred to as a "hotspot"). The cooling fluid, e.g. a cooling liquid, as it is already available in the motor vehicle, absorbs the heat generated in the connector system 100 and transports it to a respective heat sink. As a result, particularly efficient heat management and consequently efficient energy transmission can be achieved without increasing installation space and costs.

What is claimed is:

1. A cooling device for a connector element, comprising:
   a cooling channel through which a cooling fluid can flow during operation; and
   a bearing element holding the cooling channel, the cooling channel is a component separate from the bearing element and has a shape of a hollow duct engaging around the bearing element at least in a part of a circumference of the bearing element.

2. The cooling device of claim 1, wherein the hollow duct engages around the bearing element with a plurality of turns.

3. The cooling device of claim 1, wherein the hollow duct is formed of an electrically conductive material.

4. The cooling device of claim 1, wherein the bearing element is at least partly formed from an electrically insulating material.

5. The cooling device of claim 1, wherein the hollow duct is at least in part made of copper or silicone.

6. The cooling device of claim 1, wherein the bearing element is an integral part of a base body of the connector element.

7. The cooling device of claim 6, wherein the hollow duct is at least in part formed from an electrically non-conductive material.

8. The cooling device of claim 1, wherein the bearing element has a tubular shape.

9. The cooling device of claim 8, wherein the hollow duct forming the cooling channel is held in a radially circumferential groove of the bearing element.

10. A connector element, comprising:
an electrically conductive base body; and
a cooling device including a cooling channel through which a cooling fluid can flow during operation and a bearing element holding the cooling channel, the cooling channel is a component separate from the bearing element and has a shape of a hollow duct engaging around the bearing element at least in a part of a circumference of the bearing element, the bearing element surrounds the electrically conductive base body at least in part so that the cooling channel is in a thermally conductive connection with the electrically conductive base body.

11. A connector system, comprising:
a first connector element; and
a second connector element, the first connector element and the second connector element are connectable to one another in an electrically conductive manner, at least one of the first connector element and the second connector element has a cooling device including a cooling channel through which a cooling fluid can flow during operation and a bearing element holding the cooling channel, the cooling channel is a component separate from the bearing element and has a shape of a hollow duct engaging around the bearing element at least in a part of a circumference of the bearing element.

12. A method for installing a high-voltage connector element, comprising:
providing a base body with a bearing element; and
attaching a cooling channel through which a cooling fluid can flow during operation and that is held by the bearing element, the cooling channel is a component separate from the bearing element and has a shape of a hollow duct engaging around the bearing element at least in a part of a circumference of the bearing element.

13. The method of claim 12, wherein the bearing element has a sleeve-shaped collar that is slid onto the base body.

14. The method of claim 12, wherein the bearing element is formed by a receptacle that is an integral part of the base body.

15. The method of claim 12, wherein the attaching step includes winding at least one turn of the hollow duct around the bearing element.

16. The method of claim 12, further comprising connecting the hollow duct to a cooling circuit.

* * * * *